G. Bez.
Evaporating Pan.
Nº 47,511. Patented May 2, 1865.
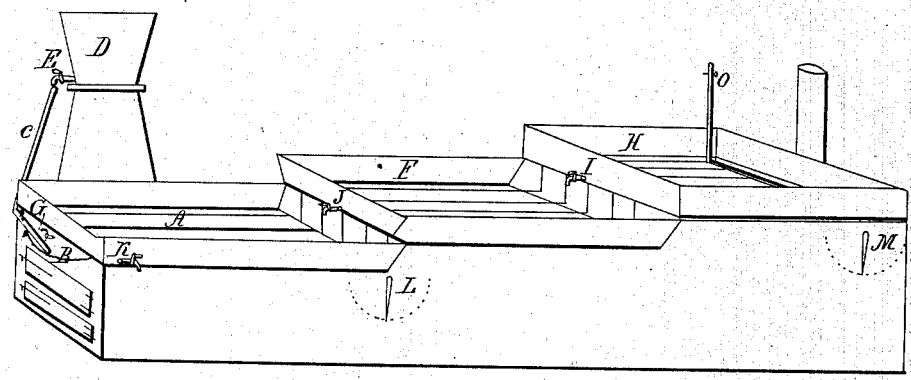
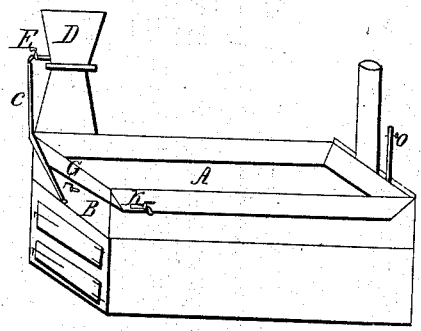
Witnesses
James M. Price
Franklin Price
Inventor
George Bez

UNITED STATES PATENT OFFICE.

GEORGE BEZ, OF MOKENA, ILLINOIS.

IMPROVED EVAPORATING-PAN.

Specification forming part of Letters Patent No. 47,511, dated May 2, 1865.

*To all whom it may concern:*

Be it known that I, GEORGE BEZ, of Mokena, in the county of Will and State of Illinois, have invented a new and useful Improvement in Machines for Evaporating the Juice of Sorghum and other Sirups; and I do hereby declare that the following is a full and exact description thereof, reference being had to the accompanying drawings, and to the letters of reference marked thereon.

The nature of my invention consists in providing a double pan, the lower part being partly filled with water, so as to prevent the possibility of scorching the sirup.

To enable others skilled in the art to make and use my invention, I will proceed to describe its construction and operation.

Figure 1 is a perspective view of the pan. Fig. 2 is a perspective view of the pan and boilers for more extensive works.

The finisher A consists of two parts, of which the bottom of the upper pan, A, forms the top of the lower pan or boiler, B. The lower part, B, is constructed of heavy sheet or boiler iron, and the upper pan, A, of galvanized iron or copper. The lower pan, B, is kept filled with water up to the gage G, and this water, being made to boil by fire in the arch, causes the sirup in the upper pan, A, to boil, and thereby all danger of scorching or burning the sirup is entirely avoided. The water is brought into the boiler by the pipe C, which leads from the tub D and forces itself into the boiler, the pressure being regulated by the height of the tub. The cock E is to regulate the amount of water while boiling.

The steam escapes through several pipes made of galvanized or wrought iron, which run through on the bottom of the pan or pans, as in Fig. 2, and escapes after passing through the heater H, thus evaporating both by fire and steam. The pans F and H have no double bottoms, as there is no danger of scorching until the juice becomes thick. The juice is drawn from the heater H by the cock I into the skimming-pan F, and from the skimming-pan F by the cock J to the finishing-pan A, and by the cock K to the tub or cooler, thereby saving all labor of dipping from one pan to another. The fire is regulated by the dampers L and M. The juice is first heated in the pan H, then drawn through the cock I to the skimming-pan F, when all impurities are removed and finally drawn through the cock J into the finishing-pan A, where it is evaporated to the desired thickness. Then it is drawn off into the cooler through K.

This evaporator does away with all danger of scorching or burning the sirup if properly attended to, and yet does not require a separate boiler. The pressure of steam is regulated by a cock, O, in the steam-pipe.

What I claim as my invention, and desire to secure by Letters Patent, is—

The combination of fire and steam pans and pipes, as herein set forth and shown, for evaporating sirups.

GEORGE BEZ.

Witnesses:
JAMES M. PEIRCE,
FRANKLIN PEIRCE.